Figure 17:
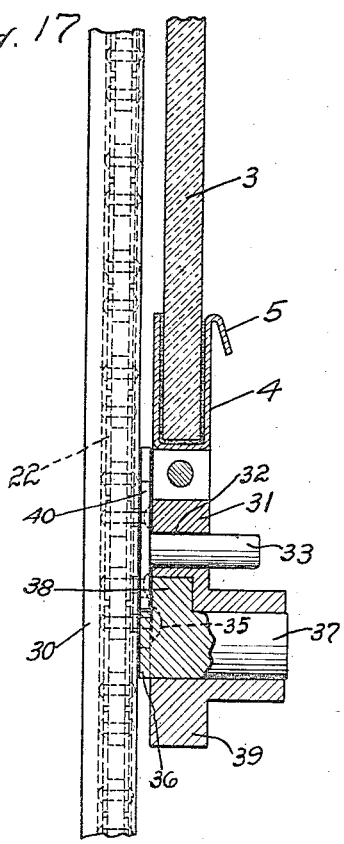

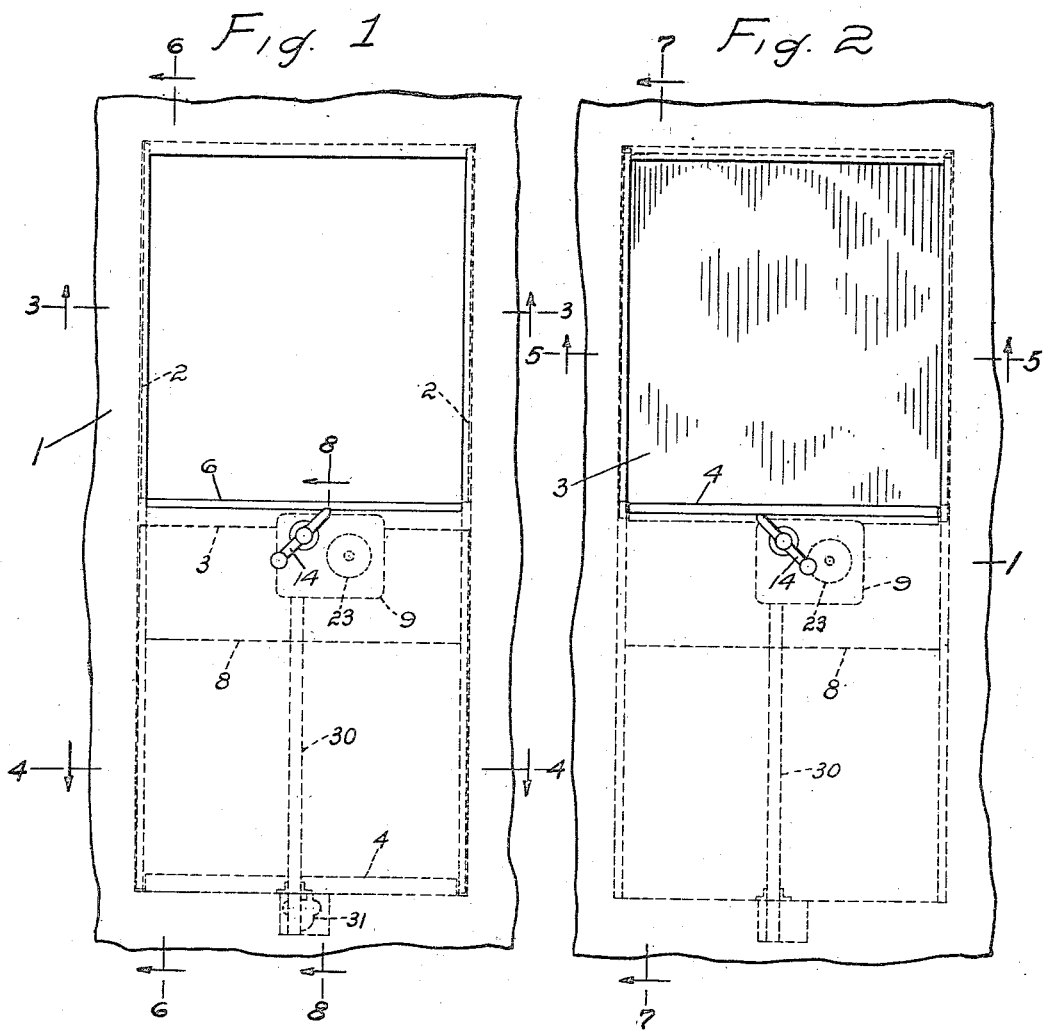

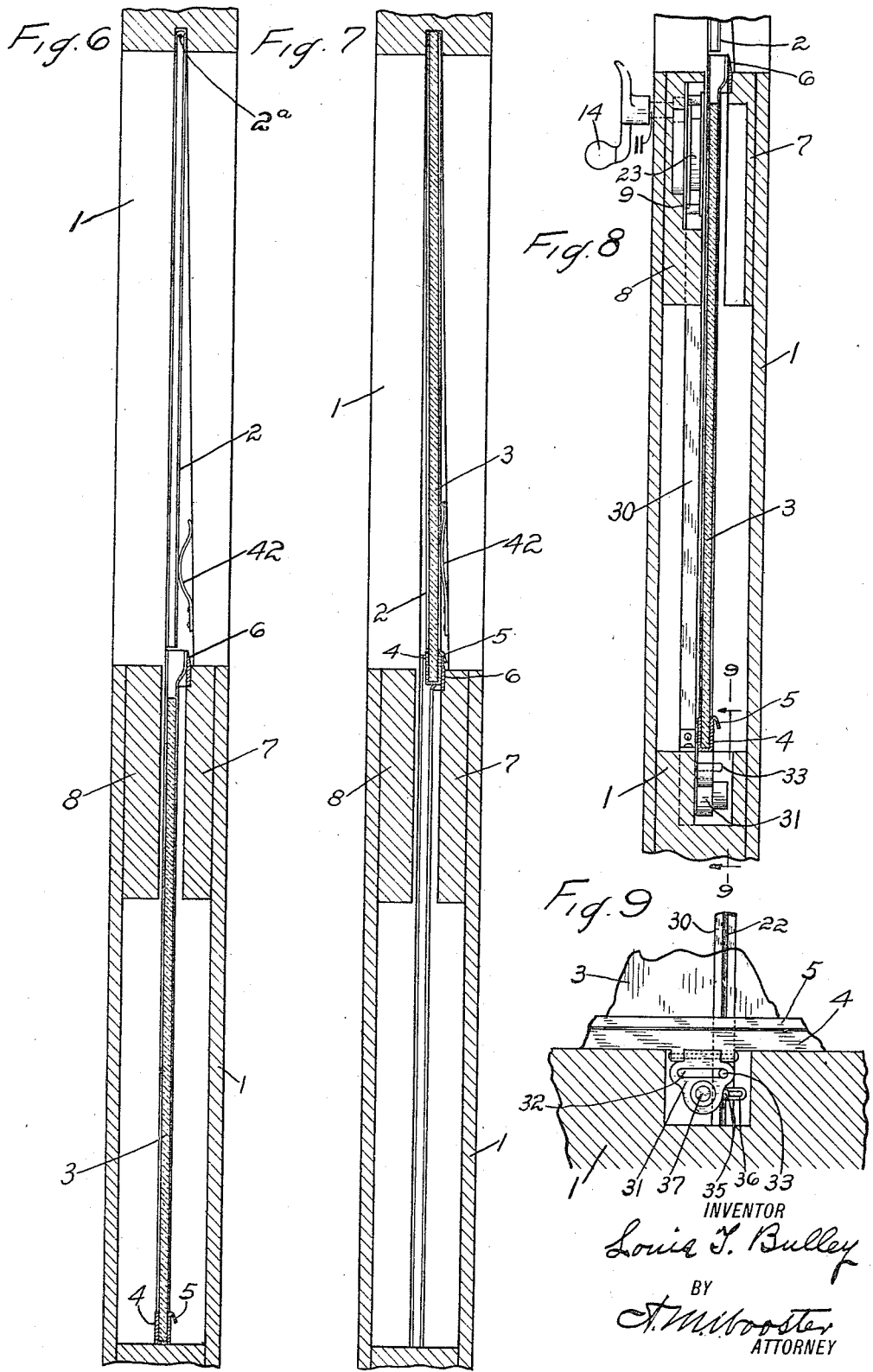

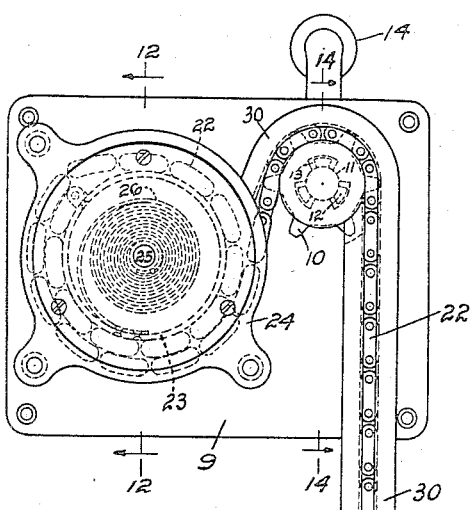
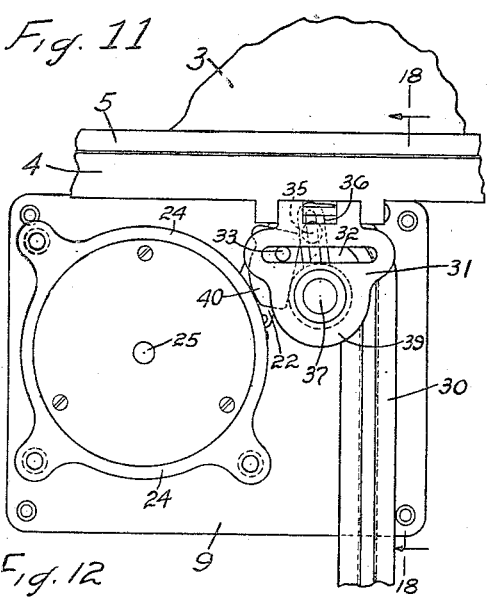
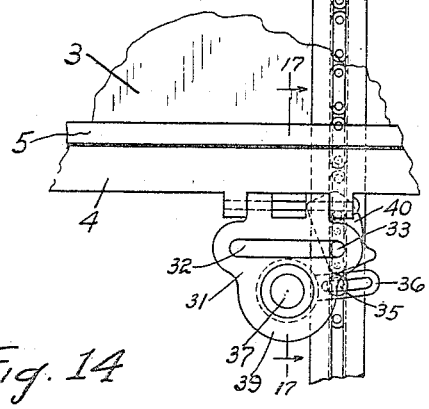
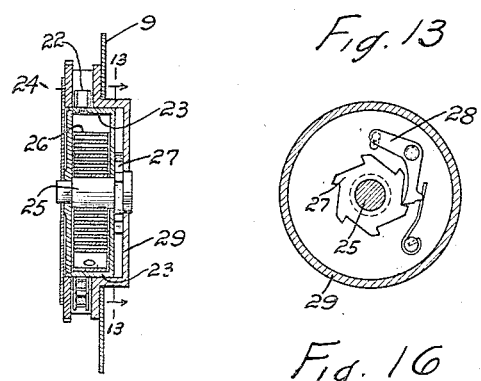
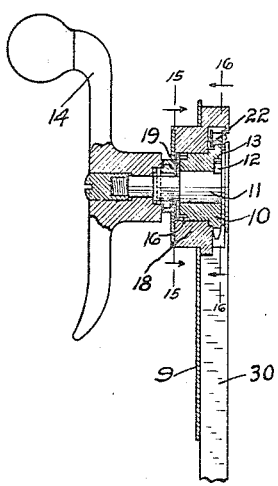
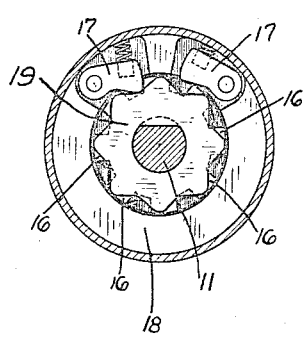
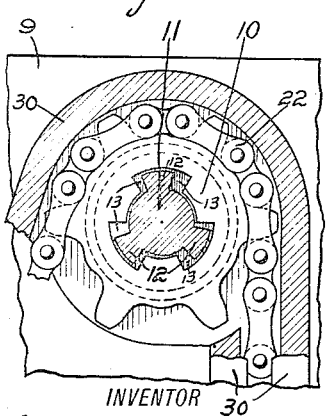

L. T. BULLEY.
WINDOW REGULATOR.
APPLICATION FILED JUNE 15, 1917.

1,245,189.

Patented Nov. 6, 1917.
4 SHEETS—SHEET 4.

INVENTOR
Louis T. Bulley
BY
A. M. Wooster
ATTORNEY

UNITED STATES PATENT OFFICE.

LOUIS T. BULLEY, OF NEW HAVEN, CONNECTICUT, ASSIGNOR TO C. COWLES AND COMPANY, OF NEW HAVEN, CONNECTICUT, A CORPORATION OF CONNECTICUT.

WINDOW-REGULATOR.

1,245,189.       Specification of Letters Patent.       Patented Nov. 6, 1917.

Application filed June 15, 1917. Serial No. 175,013.

*To all whom it may concern:*

Be it known that I, LOUIS T. BULLEY, a citizen of the United States, residing at New Haven, county of New Haven, State of Connecticut, have invented an Improvement in Window-Regulators, of which the following is a specification.

This invention relates to window operating mechanism and has particular reference to a mechanism whereby sliding disappearing windows, panels, doors, or the like, such as are used on automobiles, yachts, railway cars, etc., may be operated with a minimum of effort, and automatically latched in either extreme position, or any intermediate position.

Sliding windows of this type are commonly mounted in wide guides which confine the window against sidewise displacement while permitting it to move vertically in opening and closing, and latching means is usually provided to hold the window in closed position, this means commonly consists of a ledge or strip which the lower edge of the window sash passes above in closing, and then drops down upon or at one side of in order to latch the window closed, and to provide a shed preventing entrance of rain within the inclosure. At the present time, such windows are commonly pulled up and down by straps, and in some instances the straps are perforated to permit the window to be held in an intermediate position. At the top, springs are sometimes provided to push the window outwardly to clear the ledge, and the strap is used to pull the window down, the springs also acting to prevent rattling. In closing, the window thus has to have a vertical movement until its lower edge clears the latch, then a lateral movement to bring the lower edge over or beyond the latch, and lastly a slight reverse movement to engage the lower edge of the sash with the latch. In opening the window, the reverse operation takes place, that is the sash is first moved upwardly sufficient to bring its lower edge above the ledge, then pulled in over the ledge, and then pulled or pushed down into the frame.

The present invention has for its principal object to provide means for actuating the window in either direction, and automatically causing the window to latch itself in closing, and to automatically unlatch itself in opening, and preferably embodies a single inconspicuous controlling handle by which the window can be completely opened or closed, or held in any intermediate position without rattling, and requiring a minimum of effort.

Figure 18:
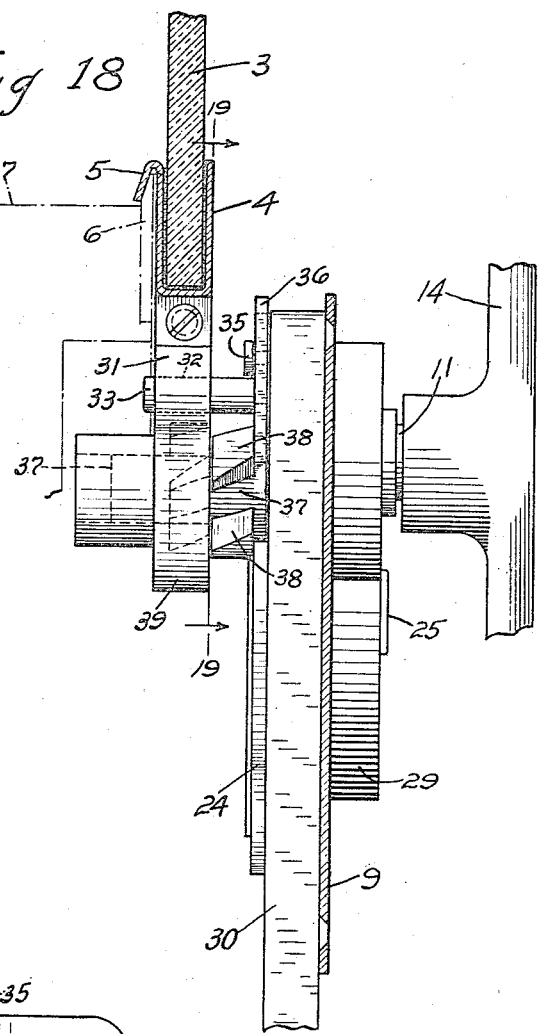
Figure 19:
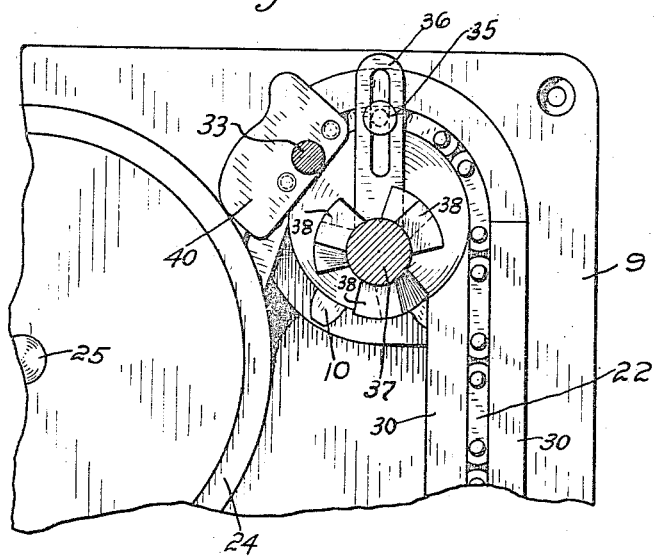

The invention with respect to a preferred form thereof is shown in the accompanying drawings, in which Figure 1 is an inside elevation of an automobile door or window having this invention applied thereto, the window being in lowered position, Fig. 2 is a similar view showing the window raised, Fig. 3 is a section on the line 3—3 of Fig. 1, Fig. 4 is a section on the line 4—4 of Fig. 1, Fig. 5 is a section on the line 5—5 of Fig. 2, Fig. 6 is a section on the line 6—6 of Fig. 1, on an enlarged scale, Fig. 7 is a section on the line 7—7 of Fig. 2, on an enlarged scale, Fig. 8 is a section on the line 8—8 of Fig. 1, on an enlarged scale, Fig. 9 is a detail sectional view on the line 9—9 of Fig. 8, Fig. 10 is a perspective view of the novel mechanism, detached from the window, but showing the position of the parts when the window is in an intermediate position, Fig. 11 shows the position of parts with the window raised and locked, Fig. 12 is a section on the line 12—12 of Fig. 10, Fig. 13 is a section on the line 13—13 of Fig. 12, Fig. 14 is a section on the line 14—14 of Fig. 10, Fig. 15 is a section, on an enlarged scale, on the line 15—15 in Fig. 14, Fig. 16 is an enlarged section on the line 16—16 of Fig. 14, Fig. 17 is a sectional view on the line 17—17 of Fig. 10, Fig. 18 is an enlarged section on the line 18—18 of Fig. 11, and Fig. 19 is a section on the line 19—19 of Fig. 18.

As shown herein, the sash is raised and lowered by means of a flexible cable or chain, the lowering of the sash being by gravity or positively, owing to the chain being confined between guides, as the chain is unwound from a drum, through the medium of a sprocket wheel which is turned by the operator, the unwinding of this chain being utilized to wind up a spring for the purpose of counterbalancing the weight of the window. Suitable ratchets or other controlling means are provided so that upon release of the operating handle the mechanism is automatically latched. In order to raise the window, the handle is turned which trips the ratchet pawls, and continued movement permits the spring to revolve the drum and wind up the chain. The chain is connected to the sash through a novel connection whereby, when the sash reaches a predetermined position, a screw and nut mechanism operates to shift the sash laterally during its vertical movement so that the bottom of the sash will clear the ledge, and then automatically reversing the movement of the sash so that it engages with or beyond the ledge. In opening the window, the reverse operation takes place, the sash being first lifted above the ledge then automatically moved laterally until it clears the ledge and is free to be moved downward by continued movement of the operating handle.

1 represents the frame having opposite channel guides 2, pivoted at the top as at 2ª, and 3 represents the sliding sash, herein shown as a pane of glass without any frame, except the bottom beading 4, and having the catch 5, adapted to engage with the ledge 6 carried on the frame sill member 7. The guides are lined with suitable material to avoid rattling and noise.

Mounted on the inside sill or cross member 8 is a plate 9 carrying a sprocket wheel 10 which is loosely mounted on an operating shaft 11. The shaft 11 has lugs 12 which engage internal radial slots 13 in the sprocket wheel, see Fig. 16, so that there is a lost motion between the shaft 11 and the sprocket 10. The shaft 11 is connected with the operating handle 14 and thereby oscillates or rotates the sprocket 10. The hub of the sprocket is provided with two sets of oppositely projecting ratchet teeth 16, which are engaged by pawls 17 mounted on the sprocket bearing block 18, itself secured to plate 9. Mounted adjacent to the pawls is a pawl tripping washer 19 on shaft 11 having projections which normally come between the pawls, but which disengage the engaged pawl from its ratchet when the handle is turned in either direction, thus permitting rotation of the sprocket. The purpose of this is so that when the spring, hereinafter to be described, tends to raise the window, the sprocket 10 will be free to rotate with the shaft, and when the sprocket is being turned by the crank 14 to lower the window it is likewise free, and thus permits the spring to be wound up in a manner hereinafter to be described. It will be seen that the lost motion between the lugs 12 on shaft 11 and the sprocket 10 will be just sufficient to cause the tripping washer 19 to trip the pawls 17.

22 is a chain which runs over sprocket 10 and then around the chain drum 23 which is rotatably mounted on a shaft 25, itself rotatably mounted in a casing, comprising plates 24 and 29. One end of the chain is attached to the drum, the other end depending from the sprocket. 26 is a coil spring, one end of which is connected to the shaft and the other end to the drum. The shaft carries a ratchet 27 which is engaged by a pawl 28 pivoted on plate 29. This construction enables the operator to place any required degree of tension on the drum controlling spring, the action of which is to counterbalance the weight of the window. When the drum is rotated by the sprocket 10 through the chain 22 in a counter-clockwise direction, the spring 26 will be wound up as long as the handle 14 is turned, but as soon as the turning of handle 14 ceases, one or the other of pawls 17 will engage its ratchet on the hub of sprocket 10 owing to backward movement of tripping washer 19, thus holding the chain 22 still. It will be seen that one or the other of pawls 17 will oppose the pull which spring 26 exerts on chain 22. The chain 22 is thus normally caused by the spring 26 to rotate the drum 23 clockwise to lift chain 22 and the window attached thereto at its lower end.

The chain 22 travels in a channel guide 30, as seen in Fig. 10. The upper end of this channel guide is partly formed in the bearing block and partly surrounds the sprocket, the remaining portion being attached to plate 9 and extending down through the casing on the inside of the sash, as seen in Fig. 8.

At the lower side of the sash below the latch portion 5 is mounted a bracket 31 having a horizontal slot 32 in which is engaged a laterally projecting pin 33 carried by the lower end of the chain 22. The function of the slot 32 in bracket 31 is to enable the pin 33 to pass over and partially around the sprocket 10, as will be seen by comparing the position of pin 33 in Figs. 9, 10 and 11, see also Fig. 19. When the pin 33 is at the top of sprocket 10, it will be in the middle of slot 32, with the sash in its highest position, and when the pin goes down on the left side of sprocket 10, the window reverses its travel, but the drum 23 is still turning in the same clockwise direction and winding up the chain.

It now only remains to describe the mechanism by which the bottom of the sash is bodily moved laterally so as to bring the catch 5 vertically over the ledge 6, so that the slight reverse movement of the sash just referred to will bring the sash down on the ledge 6 with the catch 5 engaged therewith.

The pin 33 normally carries the weight of the sash, during the most of the raising and lowering movement, and in order to throw the sash laterally outward after the catch 5 has passed above the ledge 6 in closing the window, the bracket 31 is provided with a nut and screw connection which is best shown in Figs. 9, 10, 18 and 19. Below the pin 33 the chain is provided with a second pin 35, which is engaged with a slotted lever 36 carried by a rockshaft 37 journaled in the bracket 31. The rockshaft 37 is short, and is provided with short screw threads 38 which engage with a nut 39 formed in the bracket 31. As long as the pin 35 is traveling vertically, the screw and nut are in engagement so that the sash runs close to guide 30, but when the pin 35 travels around the sprocket 10, the shaft 37 is turned by the lever, causing the screw 38 to disengage from the nut and in doing so to exert a lateral force on the bracket. This throws the bracket, and consequently the entire bottom of the sash outwardly, thus bringing the catch 5 vertically over the ledge 6, as in Fig. 18. The short reverse movement of the sash now takes place, as above referred to, and brings the catch 5 into engagement with the ledge 6. The screw 38 moves the sash and pivoted guides 2 outward against springs 42, and compresses them, as seen in Fig. 7. 40 is a stop plate fastened to the chain adjacent pin 33, which stop plate engages the drum casing to positively stop the chain from coming off the sprocket. To open the window, the operation will be to turn the crank 14 which first trips the pawls 17 of ratchet 16, and then the sash lifts the catch 5 above ledge 6, springs 42 expanding against the guides 2 (which carry the sash) and causing screw 38 to reëngage nut 39. This will draw the sash laterally inward toward the guide 30 as the slotted lever 36 revolves clockwise of Fig. 19, and the sash is positively lowered by the chain (which is confined against buckling in guide 30) as the spring 26 is simultaneously wound up. As soon as the turning of crank 14 stops, the pawls 17 hold the sprocket 10 against the spring tension and the weight of the sash.

From the foregoing description, it will be seen that a mechanism is provided for automatically moving a sash laterally and reversing it, or reversing it and then moving it laterally, in order to close or open a window without requiring special attention on the part of the operator. It will be obvious that the invention is susceptible of various modifications and that it is not to be restricted to the precise mechanism shown, since the advantageous features of the invention may be applied in various ways without departing from the scope of the appended claims.

Having thus described my invention, I claim:—

1. A window mechanism comprising a bracket for the window having a slot and a nut, a plate for the frame carrying an operating shaft and a spring controlled drum, a sprocket wheel loosely mounted on the shaft but rotated thereby, sets of oppositely projecting ratchet teeth carried by the sprocket, pawls engaging said sets of teeth, a pawl tripping washer carried by the shaft, a rock shaft journaled in the bracket and having a slotted lever and threads adapted to engage the nut, a chain one end of which is attached to the drum and which passes over the sprocket, and pins projecting from the chain one of which engages the slot in the bracket and the other the slot in the lever, whereby rotation of the operating shaft will raise and lower the window and move it laterally in latching and unlatching.

2. A window mechanism comprising a bracket for the window having a slot and a nut, a plate for the frame carrying an operating shaft and a spring controlled drum, a sprocket wheel loosely mounted on the shaft but rotated thereby and carrying sets of oppositely projecting ratchet teeth, pawls engaging said sets of teeth, means carried by the shaft for disengaging a pawl when the shaft is turned in either direction, a rock shaft having a slotted lever and threads adapted to engage the nut, a chain attached to the drum and passing over the sprocket, and pins projecting from the chain and engaging respectively the slots in the bracket and the lever.

3. A window mechanism comprising a bracket for the window having a slot and a nut, a plate for the frame carrying an operating shaft and a spring controlled drum, a sprocket wheel loosely mounted on the shaft but rotated thereby, means for locking the sprocket against rotation in either direction, means carried by the shaft for disengaging the locking means when rotated in either direction, a rock shaft journaled in the bracket and having a slotted lever and means for engaging the nut, and a chain attached to the drum and passing over the sprocket and having means for engaging respectively the slotted bracket and lever.

4. A window mechanism comprising a bracket for the window having a nut, a plate for the frame carrying an operating shaft and a spring controlled drum, a sprocket wheel loosely mounted on the shaft but rotated thereby, means for locking the sprocket against rotation in either direction, means carried by the shaft for disengaging the locking means when rotated in either direction, a rock shaft having a lever and means for engaging the nut, and a chain attached to the drum and passing over the sprocket and having pin and slot connections with both bracket and lever.

5. A window mechanism comprising a bracket for the window having a nut, a plate for the frame carrying an operating shaft having lugs, and a spring controlled drum, a sprocket wheel mounted on the shaft and having internal radial slots loosely engaged by the lugs, means for locking the sprocket against rotation in either direction, means carried by the shaft for disengaging the locking means when rotated in either direction, a rock shaft having a lever and threads for engaging the nut, and a chain attached to the drum and passing over the sprocket and having pin and slot connections with both bracket and lever.

6. A window mechanism comprising a bracket for the window having a nut, a plate for the frame carrying an operating shaft having lugs, and a spring controlled drum, a sprocket wheel mounted on the shaft and having internal radial slots, loosely engaged by the lugs, and sets of oppositely projecting ratchet teeth, pawls engaging said sets of teeth, a pawl tripping washer carried by the shaft and having projections adapted to disengage the engaged pawl, a rock shaft having a lever and threads for engaging the nut, and a chain attached to the drum and passing over the sprocket and having pin and slot connections with both bracket and lever.

7. A window mechanism comprising a bracket for the window having a slot and a nut, a plate for the frame carrying an operating shaft and a spring controlled drum, a sprocket wheel loosely mounted on the shaft but rotated thereby, and carrying sets of oppositely projecting ratchet teeth, pawls engaging said sets of teeth, a tripping washer carried by the shaft and having projections which normally come between the pawls but are adapted to disengage the engaged pawl, a rock shaft having a slotted lever and threads adapted to engage the nut, and a chain attached to the drum and passing over the sprocket and carrying pins engaging respectively the slots in the bracket and the lever.

8. A window mechanism comprising a bracket for the window having a nut, a plate for the frame carrying an operating shaft and a spring controlled drum, a sprocket wheel loosely mounted on the shaft but rotated thereby, means for locking the sprocket against rotation in either direction, means carried by the shaft for disengaging the locking means when rotated in either direction, a rock shaft having means for engaging the nut, and a lever, a chain attached to the drum and passing over the sprocket and having pin and slot connections with both bracket and lever, and a channel guide secured to the plate in which the chain travels.

9. A window mechanism comprising a bracket for the window having a nut, a plate for the frame carrying a spring controlled drum and a bearing block, a sprocket wheel having a hub mounted in the bearing block, said hub having internal radial slots and oppositely projecting ratchet teeth, an operating shaft having lugs loosely engaging said slots, pawls mounted on the bearing block and engaging said sets of teeth, a pawl tripping washer carried by the shaft, a rock shaft having a lever and means for engaging the nut, and a chain attached to the drum and passing over the sprocket and having pin and slot connections with both bracket and lever.

10. A window mechanism comprising a bracket for the window having a nut, a plate for the frame carrying a spring controlled drum and a bearing block, a sprocket wheel having a hub mounted in the bearing block and having internal radial slots and oppositely projecting ratchet teeth, an operating shaft having lugs, loosely engaging the slots, and a pawl tripping washer, pawls mounted on a bearing block and engaging said sets of teeth, a rock shaft having a lever and means for engaging the nut, and a chain attached to the drum and passing over the sprocket and having pin and slot connections with both bracket and lever.

11. A window mechanism comprising a bracket for the window having a nut, a plate for the frame carrying a spring controlled drum and a bearing block, a sprocket wheel having a hub mounted in the bearing block and having internal radial slots and oppositely projecting ratchet teeth, an operating shaft having lugs loosely engaging the slots, and a pawl tripping washer, pawls mounted on a bearing block and engaging said sets of teeth, a rock shaft having means for engaging the nut, and a lever, a chain attached to the drum and passing over the sprocket and having pin and slot connections with both bracket and lever, and a channel guide partly formed in the bearing block and partly surrounding the sprocket and extending downward from the bearing block, in which the chain travels.

12. A window mechanism comprising a bracket for the window having a nut, a plate for the frame carrying an operating shaft, a spring controlled drum and a casing for the drum, a sprocket wheel loosely mounted on the shaft but rotated thereby, means for locking the sprocket against rotation in either direction, means carried by the shaft for disengaging the locking means when rotated in either direction, a rock shaft having means for engaging the nut, and a lever, a chain attached to the drum and passing over the sprocket and having pin and slot connections with both bracket and lever, and a stop plate carried by the chain and adapted to engage the casing to limit movement of the chain.

13. A window mechanism comprising a bracket for the window having a nut, a plate for the frame carrying an operating shaft, a casing, a spring controlled drum, and pawl and ratchet mechanism within the casing for controlling the tension of the spring, a sprocket wheel loosely mounted on the shaft but rotated thereby, means for locking the sprocket against rotation in either direction, means carried by the shaft for disengaging the locking means when rotated in either direction, a rock shaft having means for engaging the nut, and a lever, and a chain attached to the drum and passing over the sprocket, and having pin and slot connections with both bracket and lever.

14. A window mechanism comprising a bracket for the window having a nut, a plate for the frame carrying an operating shaft and a spring controlled drum, a sprocket wheel loosely mounted on the shaft but rotated thereby, means for locking the sprocket against rotation in either direction, means carried by the shaft for disengaging the locking means when rotated in either direction, a rock shaft having means for engaging the nut, and a lever, a chain attached to the drum and passing over the sprocket and having pin and slot connections with both bracket and lever, and a guide for the chain to prevent buckling.

15. A window mechanism comprising a bracket for the window having a nut, a plate for the frame carrying an operating shaft and a spring controlled drum, a sprocket wheel loosely mounted on the shaft but rotated thereby, means for locking the sprocket against rotation in either direction, means carried by the shaft for disengaging the locking means when rotated in either direction, a rock shaft having means for engaging the nut, and a lever, a chain attached to the drum and passing over the sprocket and having pin and slot connections with both bracket and lever, a guide for the chain to prevent buckling, and a stop to limit movement of the chain.

16. A window mechanism comprising a bracket for the window having a nut, a plate for the frame carrying an operating shaft, a drum, a spring for controlling the drum, and means for adjusting the tension of the spring, a sprocket wheel loosely mounted on the shaft but rotated thereby, means for locking the sprocket against rotation in either direction, means carried by the shaft for disengaging the locking means when rotated in either direction, a rock shaft having means for engaging the nut, and a lever, and a chain attached to the drum and passing over the sprocket and having pin and slot connections with both bracket and lever.

17. A window mechanism comprising a bracket on the window having a nut, a plate on the frame carrying an operating shaft and a spring controlled drum, pivoted guides in which the window is adapted to slide, a sprocket wheel loosely mounted on the shaft but rotated thereby, means for locking the sprocket against rotation in either direction, means carried by the shaft for disengaging the locking means when rotated in either direction, a rock shaft having a lever and means for engaging the nut, and a chain attached to the drum and passing over the sprocket and having pin and slot connections with both bracket and lever.

18. A window mechanism comprising a bracket on the window having a nut, a plate on the frame carrying an operating shaft and a spring controlled drum, pivoted guides in which the window is adapted to slide, a sprocket wheel, loosely mounted on the shaft but rotated thereby, means for locking the sprocket against rotation in either direction, means carried by the shaft for disengaging the locking means when rotated in either direction, a rock shaft having a lever and threads adapted to engage the nut, a chain attached to the drum and passing over the sprocket and having pin and slot connections with both bracket and lever, and springs bearing against the guides and acting to retain the nut in engaging position relatively to the threads.

19. In a mechanism of the character described, the combination with a sliding window and a frame, of a nut and a rock shaft having a lever and threads engaging the nut, on the window, and on the frame a spring controlled drum, an operating shaft, a sprocket wheel loose on but rotated by the shaft, and a chain attached to the drum, passing over the sprocket and having connections with both window and lever, passage of the point of attachment of the chain to the lever over the sprocket causing the threads on the rock shaft to engage and disengage the nut.

20. In a mechanism of the character described, the combination with a sliding window and a frame, of a nut and a rock shaft having a lever and threads engaging the nut, on the window, and on the frame a spring controlled drum, an operating shaft, a sprocket wheel loose on but rotated by the shaft, means for locking the sprocket against rotation in either direction, means carried by the shaft for disengaging the locking means when rotated in either direction, and a chain attached to the drum, passing over the sprocket and having connections with both window and lever.

21. In a mechanism of the character described, the combination with a sliding window and a frame, of a nut and a rock shaft having threads engaging the nut, on the window, and on the frame a spring controlled drum, an operating shaft, a sprocket wheel loose on but rotated by the shaft, and a chain attached to the drum, passing over the sprocket and having connections with both window and rock shaft.

22. In a mechanism of the character described, the combination with a sliding window and a frame, of a nut and a rock shaft having threads engaging the nut, on the window, and on the frame a spring controlled drum, a sprocket wheel, and a chain attached to the drum, passing over the sprocket and having connections with both window and rock shaft.

23. In a mechanism of the character described, the combination with a sliding window and a frame, of a nut and a rock shaft having a lever and threads engaging the nut, on the window, and on the frame a spring controlled drum, a sprocket wheel, operating and locking means for the sprocket, and a chain attached to the drum passing over the sprocket and having connections with both window and lever.

24. In a mechanism of the character described, the combination with a sliding window and a frame, of a nut and a rock shaft having threads engaging the nut, on the window, and on the frame a spring controlled drum, a sprocket wheel, a chain attached to the drum, passing over the sprocket and having connections with both window and rock shaft, and a guide in which the chain travels to prevent buckling.

25. In a mechanism of the character described, the combination with a sliding window and a frame, of a nut and a rock shaft having a lever and threads engaging the nut, on the window, and on the frame a spring controlled drum, a sprocket wheel, operating and locking means for the sprocket, a chain attached to the drum, passing over the sprocket and having connections with both window and lever, and a guide partly surrounding the sprocket and extending downward therefrom in which the chain travels to prevent buckling.

In testimony whereof I affix my signature.

LOUIS T. BULLEY.